United States Patent
Yam

(10) Patent No.: US 8,095,178 B2
(45) Date of Patent: *Jan. 10, 2012

(54) WIRELESS INTELLIGENT SWITCH ENGINE

(75) Inventor: Eric Yam, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/717,404

(22) Filed: Mar. 4, 2010

(65) Prior Publication Data

US 2010/0157868 A1    Jun. 24, 2010

Related U.S. Application Data

(63) Continuation of application No. 10/387,362, filed on Mar. 11, 2003, now Pat. No. 7,702,357.

(60) Provisional application No. 60/429,480, filed on Nov. 26, 2002.

(51) Int. Cl.
 *H04M 1/00* (2006.01)
 *H04W 4/00* (2009.01)
 *H04H 20/67* (2008.01)

(52) U.S. Cl. .................. 455/552.1; 455/432.1; 370/338; 370/339

(58) Field of Classification Search .................. 455/560, 455/557, 558, 436, 437, 552.1, 432.1, 41.2, 455/435.2; 370/328, 230, 331–334, 338–339; 709/227, 228, 217, 218
See application file for complete search history.

(56) References Cited

U.S. PATENT DOCUMENTS

| | | | |
|---|---|---|---|
| 6,243,581 B1 | 6/2001 | Jawanda | |
| 6,847,620 B1 * | 1/2005 | Meier | 370/328 |
| 7,006,472 B1 * | 2/2006 | Immonen et al. | 370/332 |
| 7,009,952 B1 * | 3/2006 | Razavilar et al. | 370/331 |
| 7,058,059 B1 | 6/2006 | Henry et al. | |
| 7,177,952 B1 | 2/2007 | Wurch et al. | |
| 2003/0145108 A1 * | 7/2003 | Joseph et al. | 709/239 |
| 2003/0185233 A1 * | 10/2003 | Ji et al. | 370/466 |
| 2004/0090935 A1 | 5/2004 | Courtney | |
| 2004/0204071 A1 | 10/2004 | Bahl et al. | |

* cited by examiner

*Primary Examiner* — George Eng
*Assistant Examiner* — Nam Huynh
(74) *Attorney, Agent, or Firm* — John P. O'Banion

(57) ABSTRACT

A wireless intelligent switch engine (WISE) is described. The wireless intelligent switch engine provides for automatic switching between different physical wireless interfaces in mobile devices while roaming to maintain a wireless network connection. WISE functions as a bridge between a mobile device and multiple wireless network interfaces to provide automatic and seamless switching among networks while roaming. The mobile device sees WISE as a LAN interface and communicates with WISE using the TCP/IP protocol stack, thus providing a PPP-less configuration that uses the TCP/IP protocol stack regardless of the wireless interface.

20 Claims, 13 Drawing Sheets

WIRELESS INTELLIGENT SWITCH ENGINE

CROSS-REFERENCE TO RELATED APPLICATIONS

This application is a continuation of U.S. patent application Ser. No. 10/387,362 filed on Mar. 11, 2003, now U.S. Pat. No. 7,702,357, incorporated herein by reference in its entirety, which claims priority to U.S. application Ser. No. 60/429,480 filed on Nov. 26, 2002, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to wireless networking, and more particularly to an apparatus and method that provides for automatic switching between different network interfaces in a mobile device so that the mobile device can seamlessly roam among different types of wireless networks.

2. Description of Related Art

In recent years, wireless network interfaces have become extremely important to the functionality of mobile devices. Examples of mobile devices that use wireless networking are laptop computers and personal digital assistants (PDAs). Wireless connectivity of a mobile device to the Internet or to an intranet can increase mobility, convenience and productivity, but there are certain limitations associated with that connectivity. For example, the widely used IEEE 802.11 (WLAN) wireless networking technology provides high bandwidth but is limited in geographical coverage. On the other hand, while cellular technologies such as CDMA/WD-CMA/GSM/GPRS (WAN) provide much wider (and even global) geographical coverage, they do so at a much lower bandwidth than 802.11 networking.

Due to the use of different standards and communications protocols for wireless networking, in order to achieve true global coverage it is currently necessary to utilize a combination of several plug-in or integrated connectivity interfaces and to manually switch between interfaces while roaming through different geographical areas or communication sites. For example, a laptop computer or PDA may have an integrated 802.11b interface and one or more PCMCIA or CF-card slots for swappable add-on cards. This allows the user to, for example, select among IEEE 802.11a, IEEE 802.11b, CDMA/WCDMA or GSM/GPRS wireless interface cards. Again, however, the user experiences a degree of inconvenience since it is necessary to manually enable, disable or otherwise switch between the interfaces. For example, the user may have to manually switch from an 802.11 module to a CDMA/WCDMA or GSM/GPRS module if the user moves from 802.11 hot spots to cellular networks. With many operating systems, this also requires the user to close the network connection session and restart it again using the new wireless interface.

Those skilled in the art will appreciate that network communications typically rely on the Open Systems Interconnection (OSI) Reference Model in which there are seven communications layers. Currently, products are available that use OSI Layer 5 to provide proxy-based session level mobility and OSI Layer 3 with Mobile IP to provide network level mobility. However, those products are based on a client/server architecture and roaming connection changes require interactions of both client and server components.

Accordingly, there is a need for seamless roaming capability to be built-in to mobile devices so that different wireless interfaces will automatically be selected while roaming without the need for manual selection and/or restarting the wireless networking session. The present invention satisfies that need as will herein be described.

BRIEF SUMMARY OF THE INVENTION

The present invention provides for the automatic switching between different physical wireless interfaces in mobile devices while roaming to maintain a wireless network connection. In general terms, the invention comprises a wireless intelligent switch engine (WISE) that functions as a bridge to provide network connection switching between different interfaces.

According to an aspect of the invention, network connection switching is accomplished through the use of Open Systems Interconnection (OSI) Layer 2 Media Access Control (MAC) bridging technology. Those skilled in the art will appreciate that OSI specifies seven layers ranging from the physical layer to the application layer. Layer 2, the data link layer, defines rules for sending/receiving data across the physical connection between two systems.

In one embodiment, the present invention comprises a Layer 2 bridge that provides network switching between WLAN (802.11) or WAN (GSM/GPRS/CDMA/WCDMA) using 802.1p/802.1D/802.11 standards to select the desired wireless interface. In one embodiment, the bridge resides within the mobile device. In another embodiment, the bridge is external to the mobile device.

As can be seen, therefore, an object of the invention is to allow a mobile device to connect to any wireless network seamlessly. Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 14. It will be appreciated that the apparatus may vary as to configuration and as to details of the components, and that the method may vary as to the specific steps and sequence, without departing from the basic concepts as disclosed herein.

Figure 1:
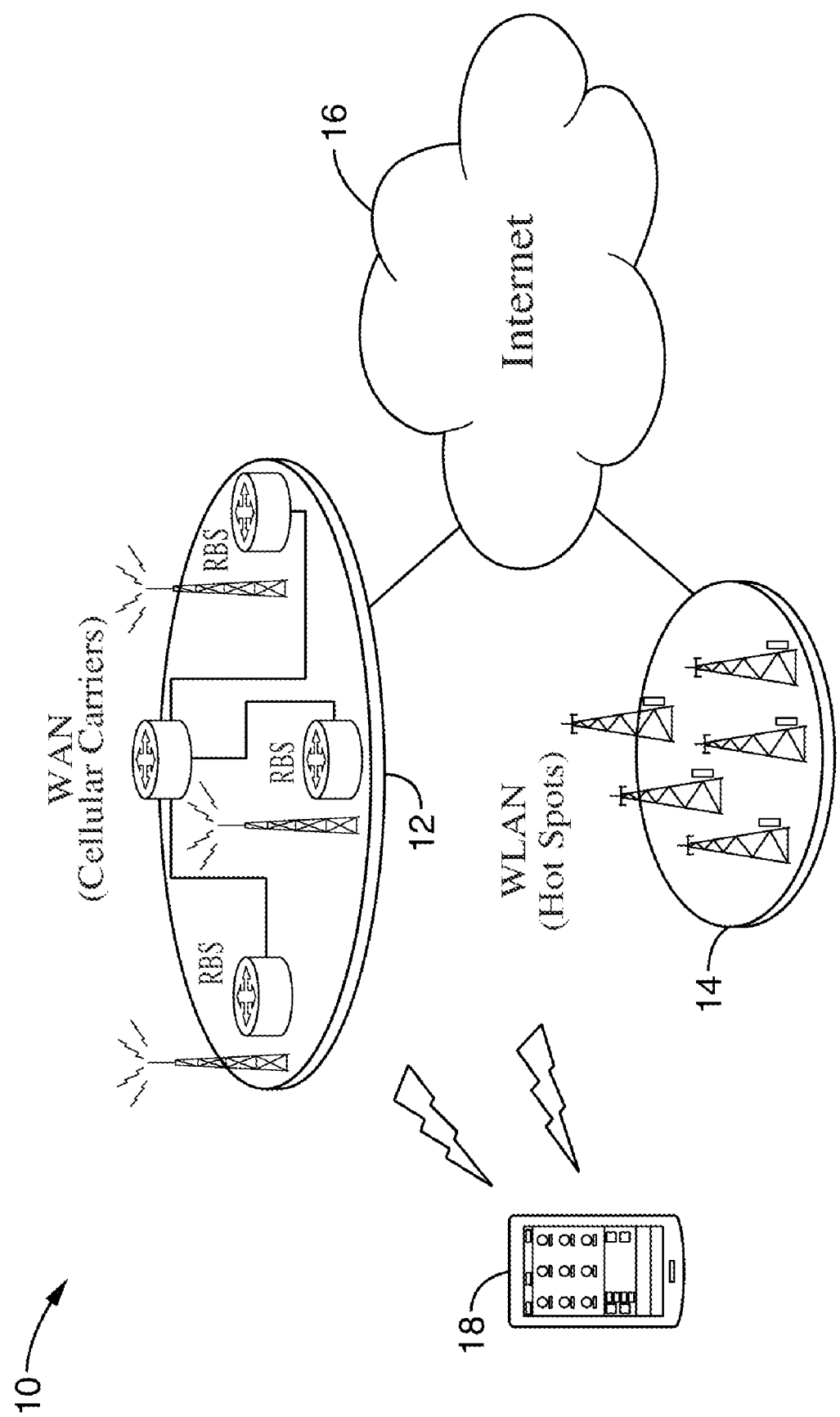
FIG. 1 is a schematic diagram of a wireless network connected to which a mobile device is connected using a wireless intelligent switch engine according to the present invention.

Referring first to FIG. 1, an example of a wireless network 10 is shown comprising a WAN 12 established by cellular carriers and a WLAN 14 established by a high speed infrastructure, both of which are connected either wirelessly or by wired connections to the Internet 16. A mobile device 18, such as a laptop personal computer (PC) or personal digital assistant (PDA), is also shown with capability of communicating with both types of wireless networks. For seamless roaming between those networks, mobile device 18 includes a wireless intelligent switch engine (WISE) according to the present invention as will now be described.

Preferably, the WISE is completely internal to the mobile device, but it will be appreciated that the WISE can be implemented externally as well. WISE communicates with the mobile device and the wireless interface devices, functioning as a bridge between the mobile device and the wireless interface devices such that, as the mobile device roams among the wireless networks, WISE automatically selects the wireless interface associated with the wireless network for seamless roaming. This is accomplished, in part, by interfacing with the mobile device's TCP/IP protocol stack.

Figure 2:
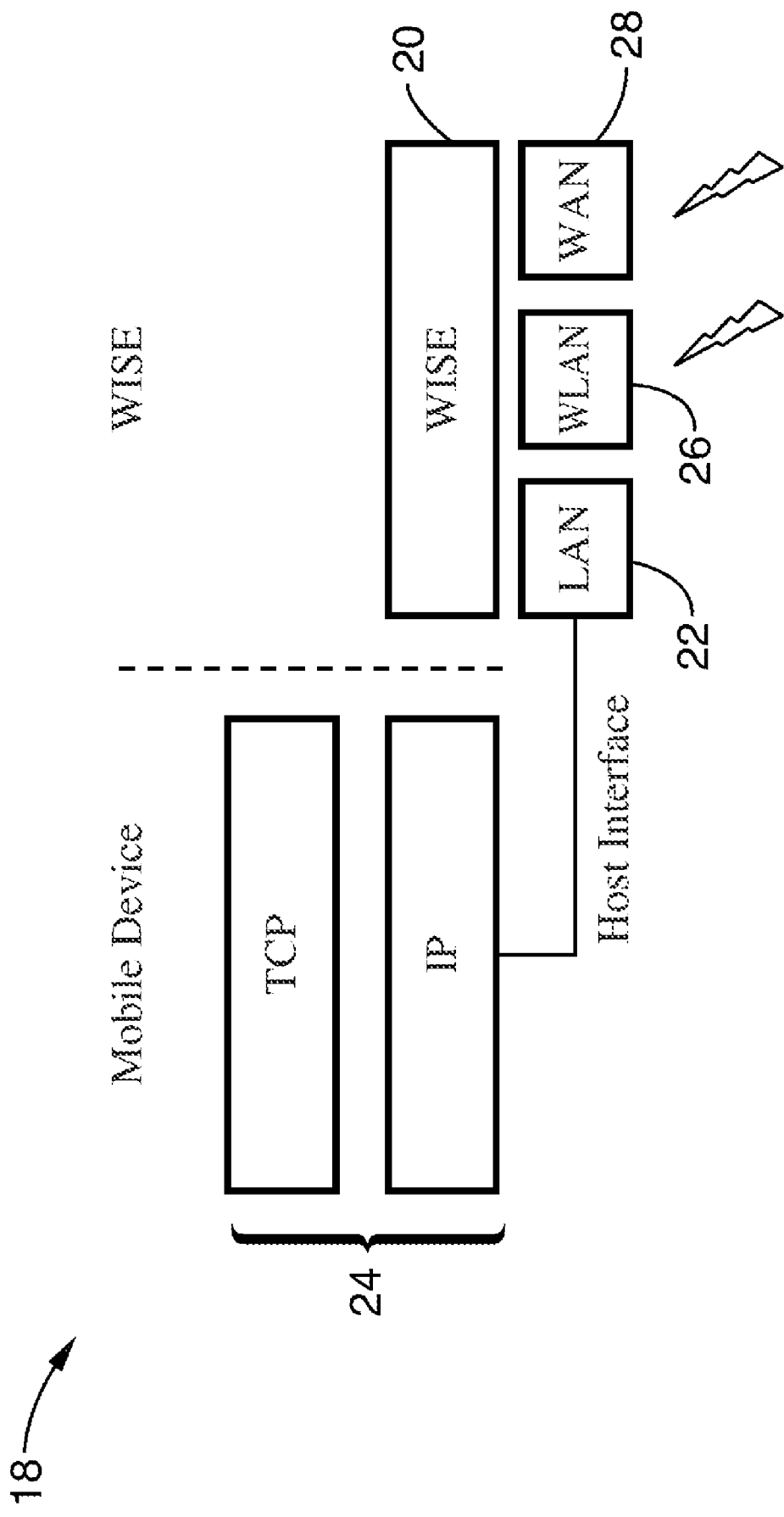
FIG. 2 is a diagram showing the relationship of the protocol stacks in a mobile device and a wireless intelligent switch engine according to the present invention.
Figure 3:
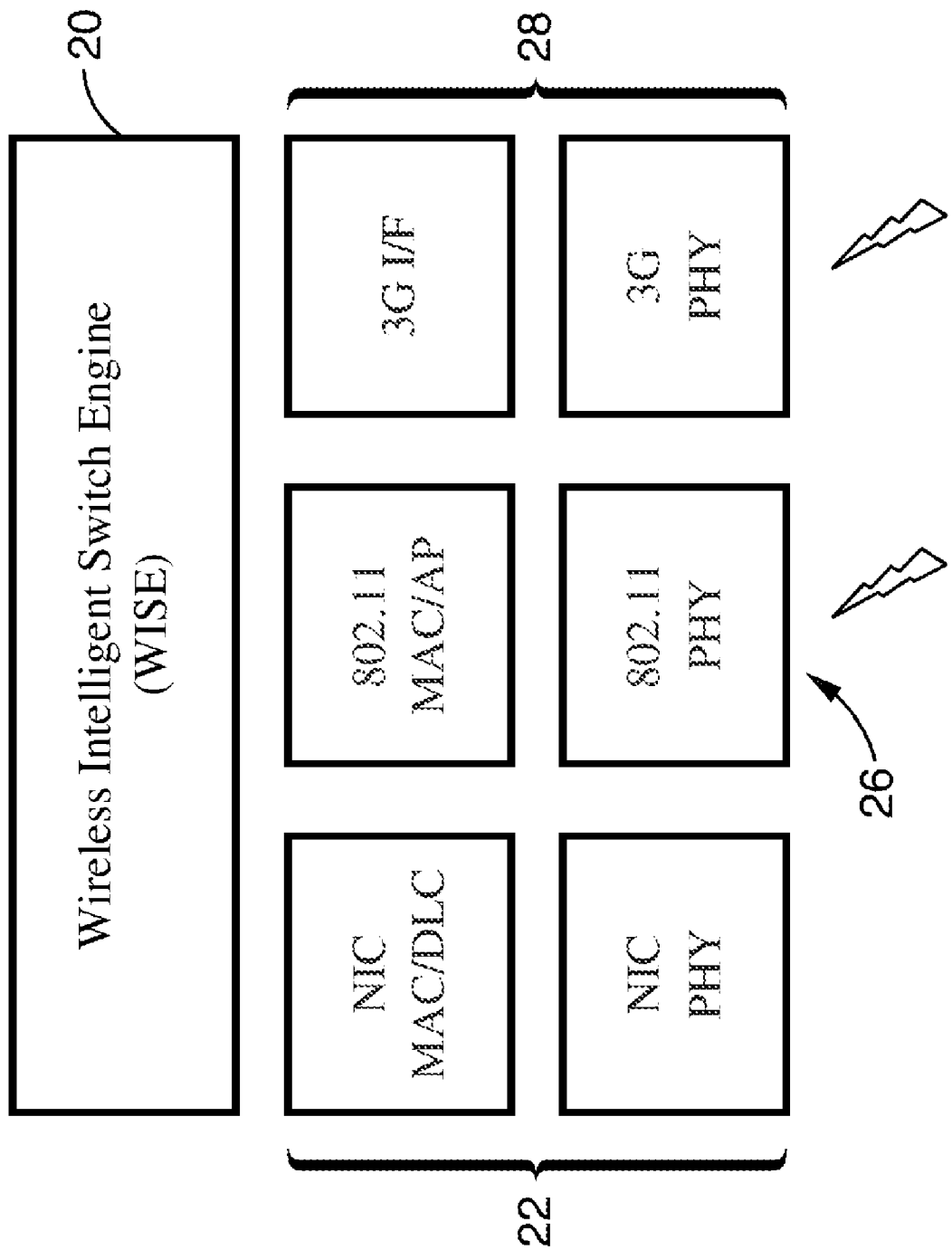
FIG. 3 is a diagram showing an embodiment of the protocol stacks used in a wireless intelligent switch engine according to the present invention.

Referring to FIG. 2 and FIG. 3, an example of the relationship between the protocol stack of the mobile device and that of the WISE can be seen. As shown, the WISE 20 appears to mobile device 18 as a network interface card (NIC) 22, thus providing a PPP-less interface (PPP refers to Point-to-Point Protocol) is known in the with the mobile device's TCP/IP protocol stack 24, and bridging mobile device 18 to the required wireless interface device such as WLAN interface device 26 and WAN interface device 28 shown. By functioning as a bridge between the mobile device and its associated wireless network interface devices, WISE 20 allows for seamless roaming among different wireless networks.

Figure 4:
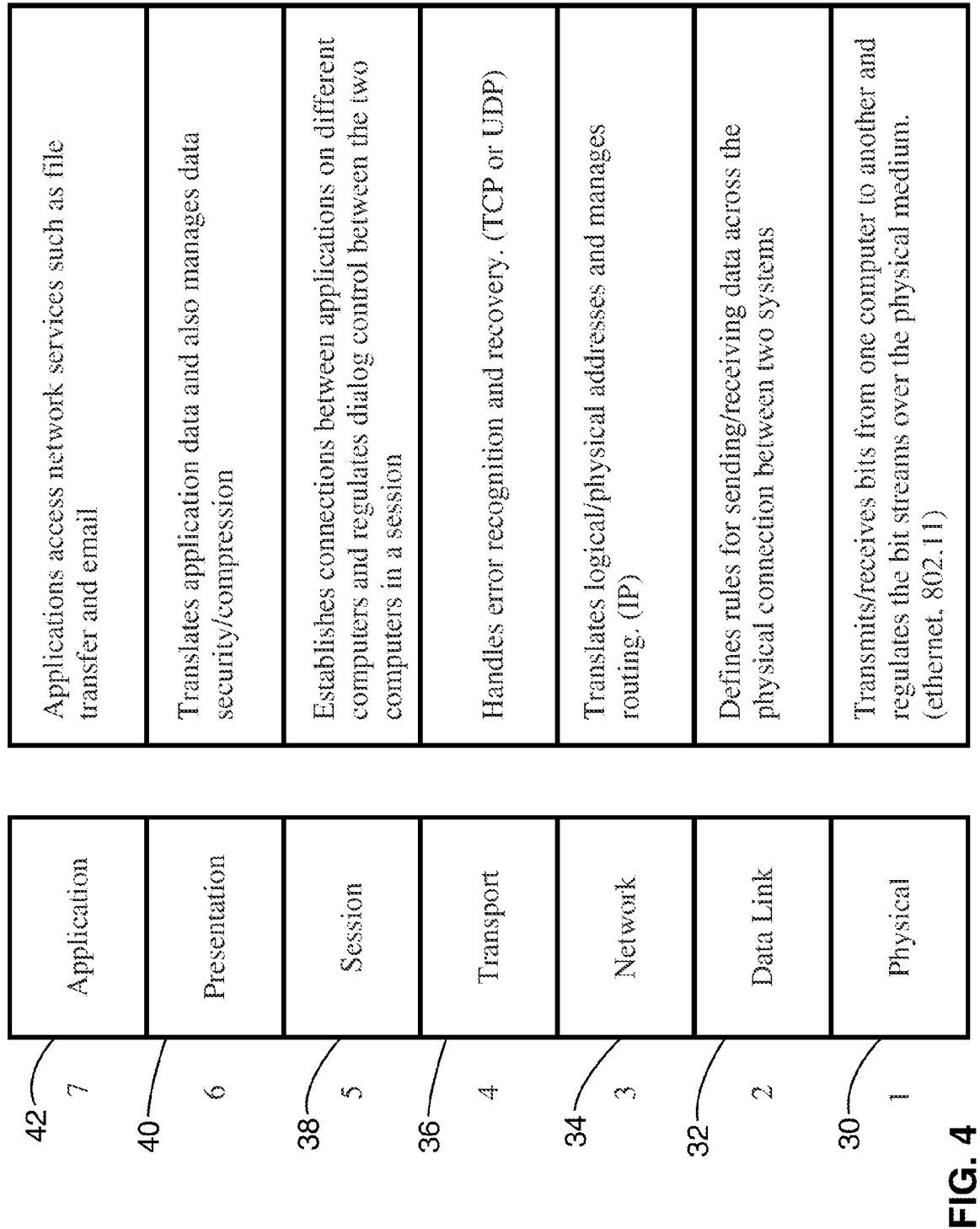
FIG. 4 is a diagram showing the Open Systems Interconnection (OSI) Reference Model with Layer 2 Media Access Control (MAC) used in the present invention.

The invention automatically switches between the wireless network interface devices using bridging technology that is based on the Open Systems Interconnection (OSI) Reference Model. As shown in FIG. 4, OSI specifies a physical layer 30 (Layer 1), a data link layer 32 (Layer 2), a network layer 34 (Layer 3), a transport layer 36 (Layer 4), a session layer 38 (Layer 5), a presentation layer 40 (Layer 6) and an application layer 42 (Layer 7). The bridging technology employed by the WISE of the present invention is based on OSI Layer 2 Media Access Control (MAC) and the IEEE 802.1D bridging standard.

Figure 5:
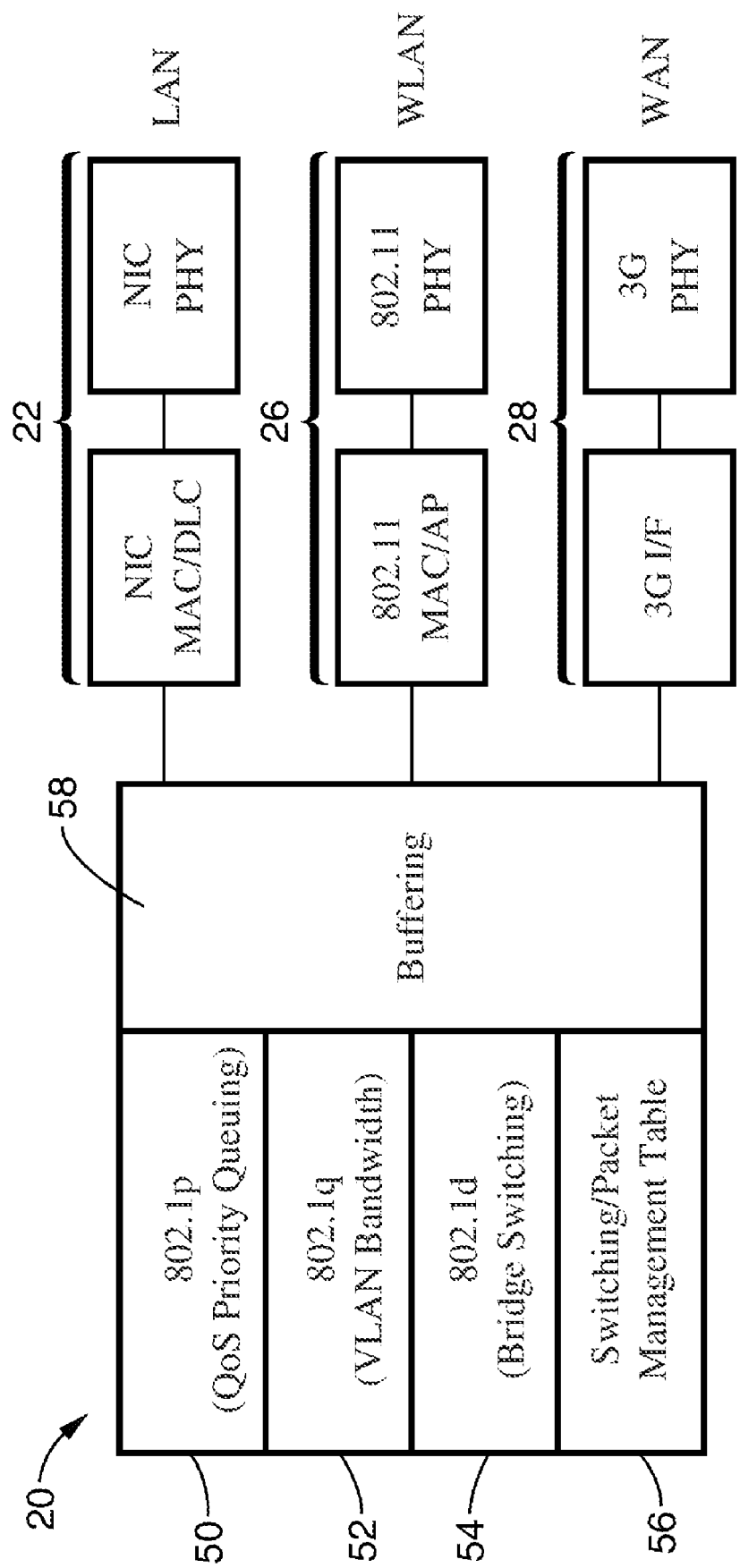
FIG. 5 is a block diagram showing the internal architecture of the wireless intelligent switch engine of the present invention.
Figure 6:
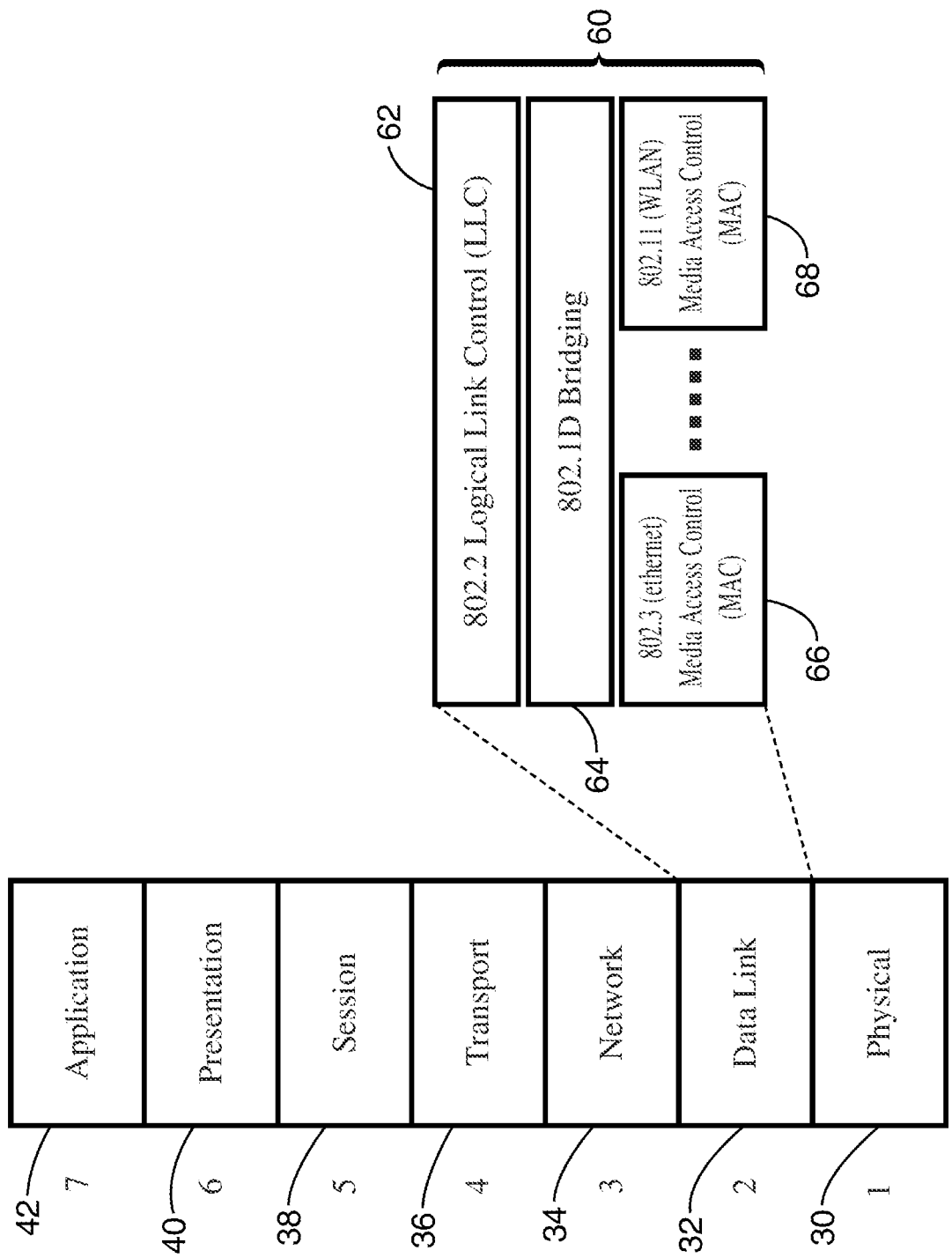
FIG. 6 is a block diagram showing the IEEE 802.1D protocol stack employed in the present invention.

Referring now to FIG. 5, an embodiment of the WISE internal architecture can be seen. In the embodiment shown, WISE 20 comprises a QoS Priority Queuing module 50 (802.1p), a VLAN Bandwidth Tagging module 52 (802.1Q), a Bridge Switching module 54 (802.1D), a Switching/Packet Management Table 56, and a buffering module 58 to provide dynamic filtering and switching between a plurality of wireless interfaces. Referring more particularly to FIG. 6, the IEEE 802.1D MAC Bridge specifies an architecture and protocol for the interconnection of networks below the MAC service boundary. The protocol stack 60 comprises 802.2 Logical Link Control (LLC) 62 and 802.1D bridging 64 for communication with, for example, 802.3 (Ethernet) MAC 66 and 802.11 (WLAN) MAC 68 at the OSI data link layer 32 (Layer 2).

Figure 7:
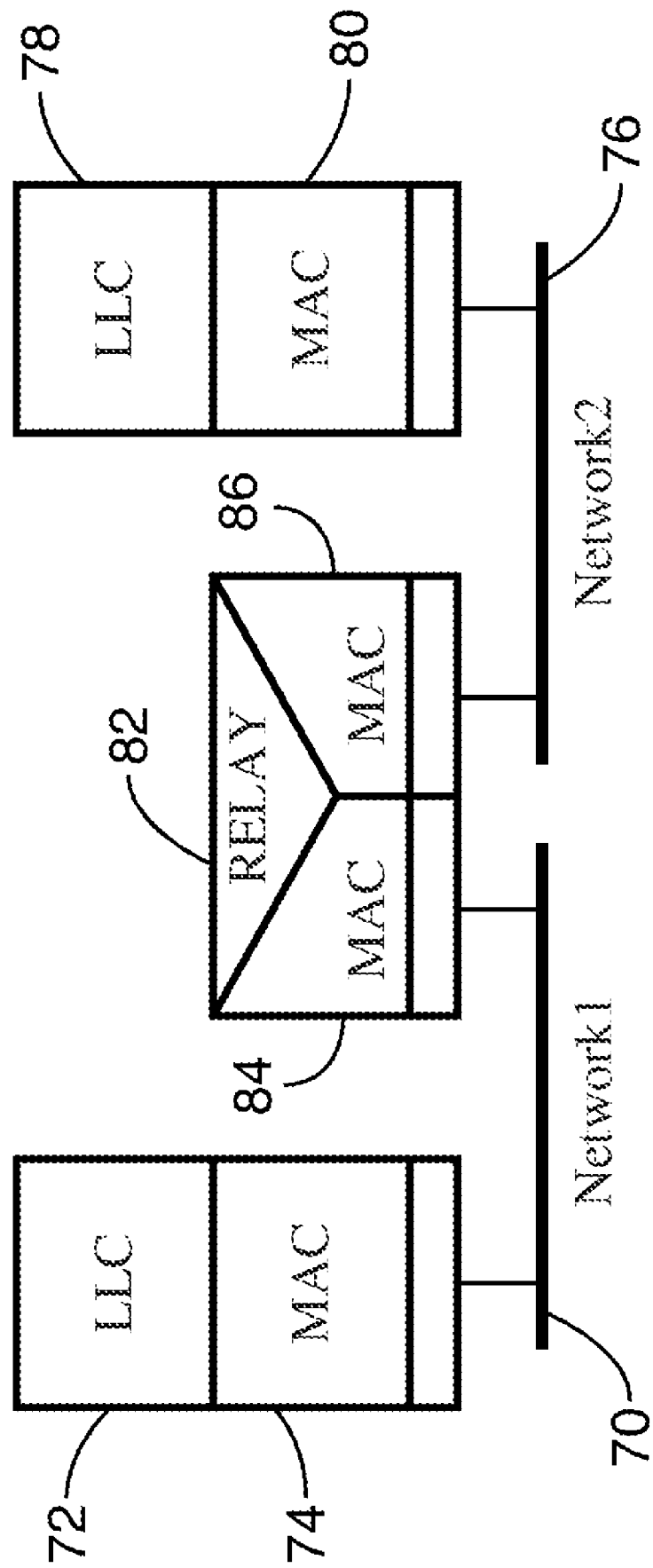
FIG. 7 is a block diagram showing the IEEE 802.1D internal organization of the MAC sublayer employed in the present invention.
Figure 8:
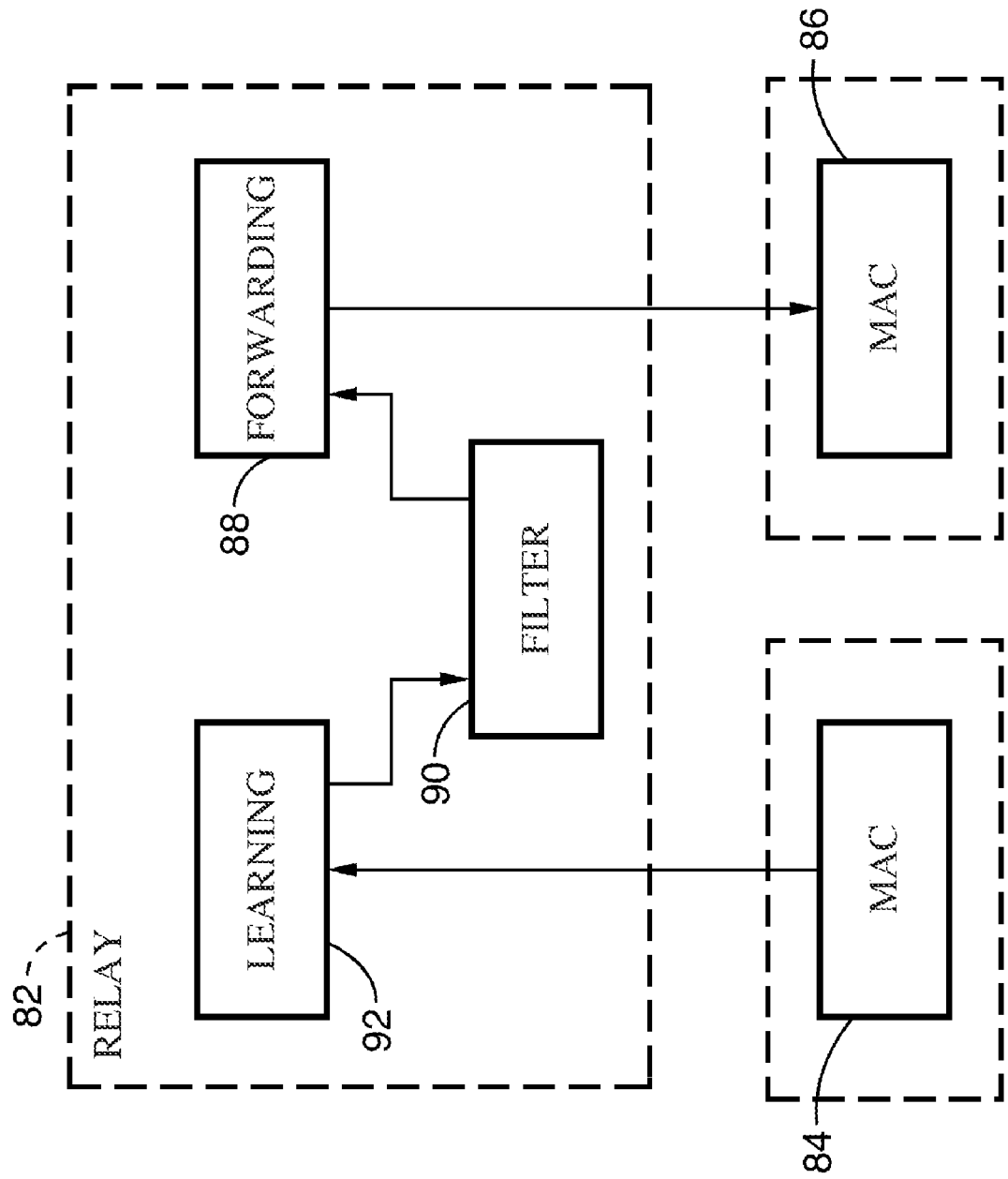
FIG. 8 is a block diagram showing the internal organization of the relay block of FIG. 7.

FIG. 7 and FIG. 8 illustrate an example of the internal organization of the MAC sublayer based on 802.1D. In FIG. 7, a first network 70 with LLC 72 and MAC 74 is shown interconnected to a second network 76 with LLC 78 and MAC 80 by means of an 802.1D relay module 82 and corresponding bridging MAC 84, 86 for each network interconnection. The 802.1D bridging standard defines rules to provide relay capabilities between the two networks. As illustrated in FIG. 8, relay module 82 comprises three components: a forwarding process 88, a filtering database 90, and a learning process 92. The forwarding process 88 forwards received frames of data that are to be relayed to other bridge ports. The forwarding process also filters frames on the basis of information contained in the filter database 90 (e.g., QoS/priority values) and on the basis of the state of the bridge ports (e.g., on/off based on signal strength and availability of service). The learning process 92 observes the QoS/priority properties of frames received on each port and updates the filter database 90 conditionally on the port state. The filter database 90 holds filtering information and supports queries by the forwarding process 88 as to whether frames with given values of the destination MAC address are to be forwarded (relayed) to a given port.

WISE 20 then uses the priority field as defined in IEEE 802.1p to select the proper wireless interface. WISE 20 assigns priorities (0~7) based on frame quality; that is, based on the frame error rate (FER). The FER can be obtained from the wireless interface itself in most cases or can be computed from the receive frame CRC error. The priorities assignment can also use signal strength obtained from the wireless interface in addition to FER and CRC. Based on this information, the network interface with higher priority or higher quality and higher bandwidth is selected as the preferred wireless connection.

Figure 9:
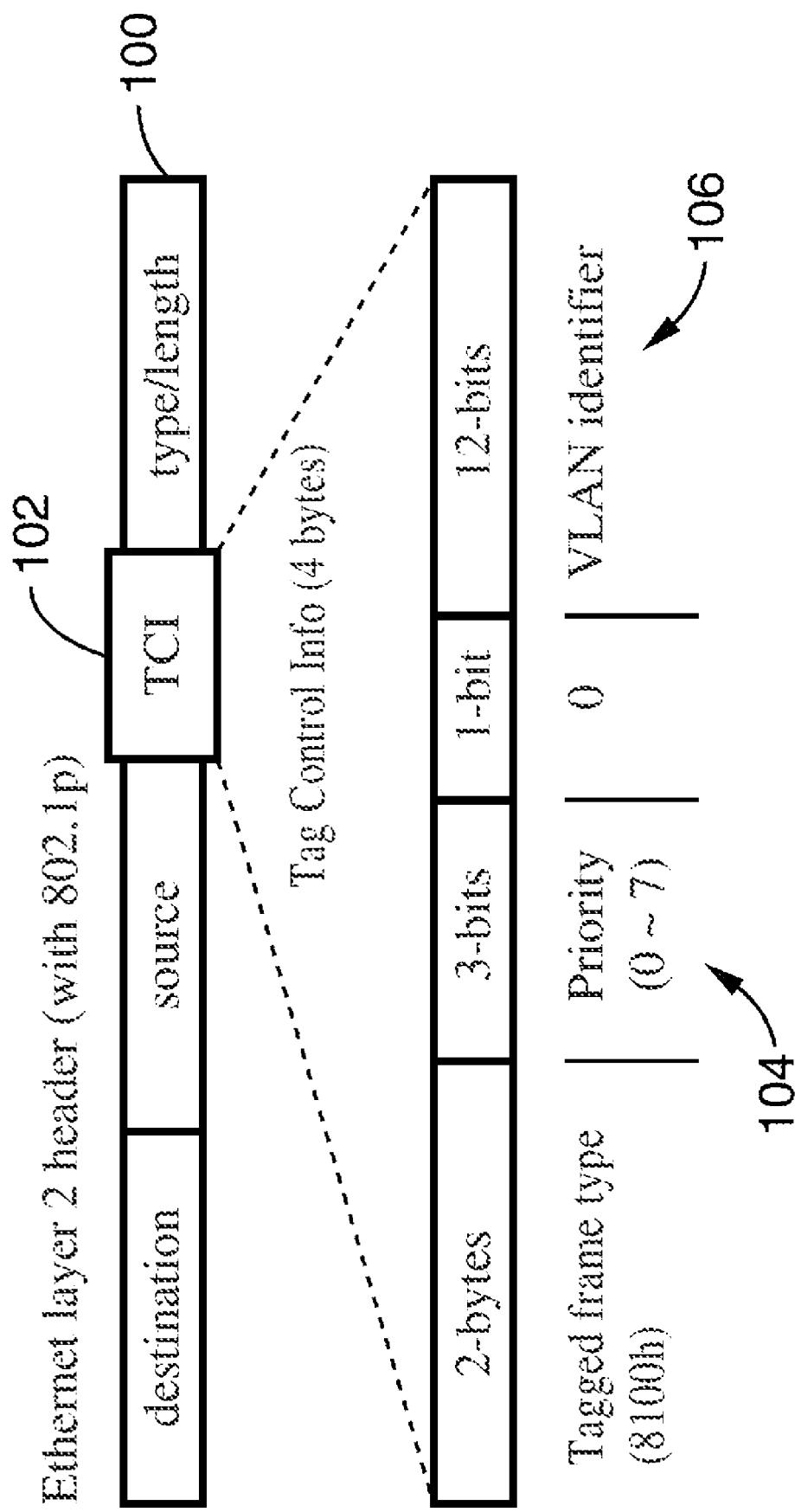
FIG. 9 is a diagram showing the OSI Layer 2 packet header with IEEE 802.1p tag control employed in the present invention.

FIG. 9 illustrates the packet header 100 used by WISE 20, which is an Ethernet OSI Layer 2 packet header with an 802.1p tag control information field 102. The priority value maps to the 3-bits field 104 of the packet header and the tag control information field 104 maps to the switching/packet management table 56 (see FIG. 5) as one of the switching criteria for the filter database 90.

To enable WISE 20 to select among a plurality of wireless interfaces, channel identifications are assigned to each of the wireless interfaces based on the IEEE 802.1Q standard. The VLAN identifier 106 is shown as part of the tag control information field 104 in FIG. 9 is defined in the IEEE 802.1Q standard. WISE 20 uses this field to assign network identification or channel numbers for LAN (interface with the mobile host device), for WLAN, for CDMA/WCDMA or for GSM/GPRS networks so that WISE 20 can forward data packets to the appropriate channel and corresponding network interface.

Figures 10, 11:
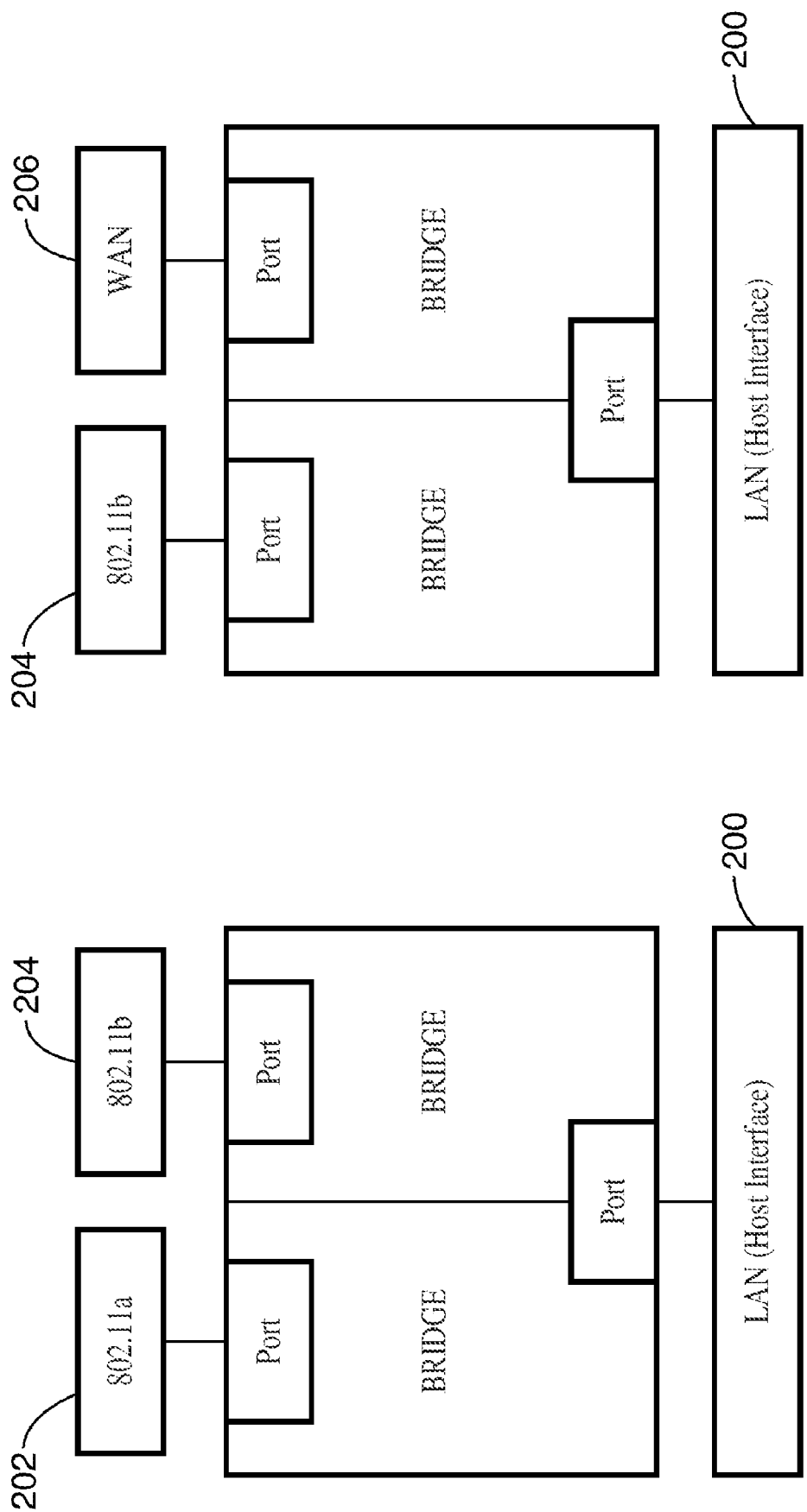
FIG. 10 is a block diagram of a dual mode 802.11a/b configuration supported by the wireless intelligent switch engine of the present invention.
FIG. 11 is a block diagram of a WLAN and WAN configuration supported by the wireless intelligent switch engine of the present invention.
Figure 12:
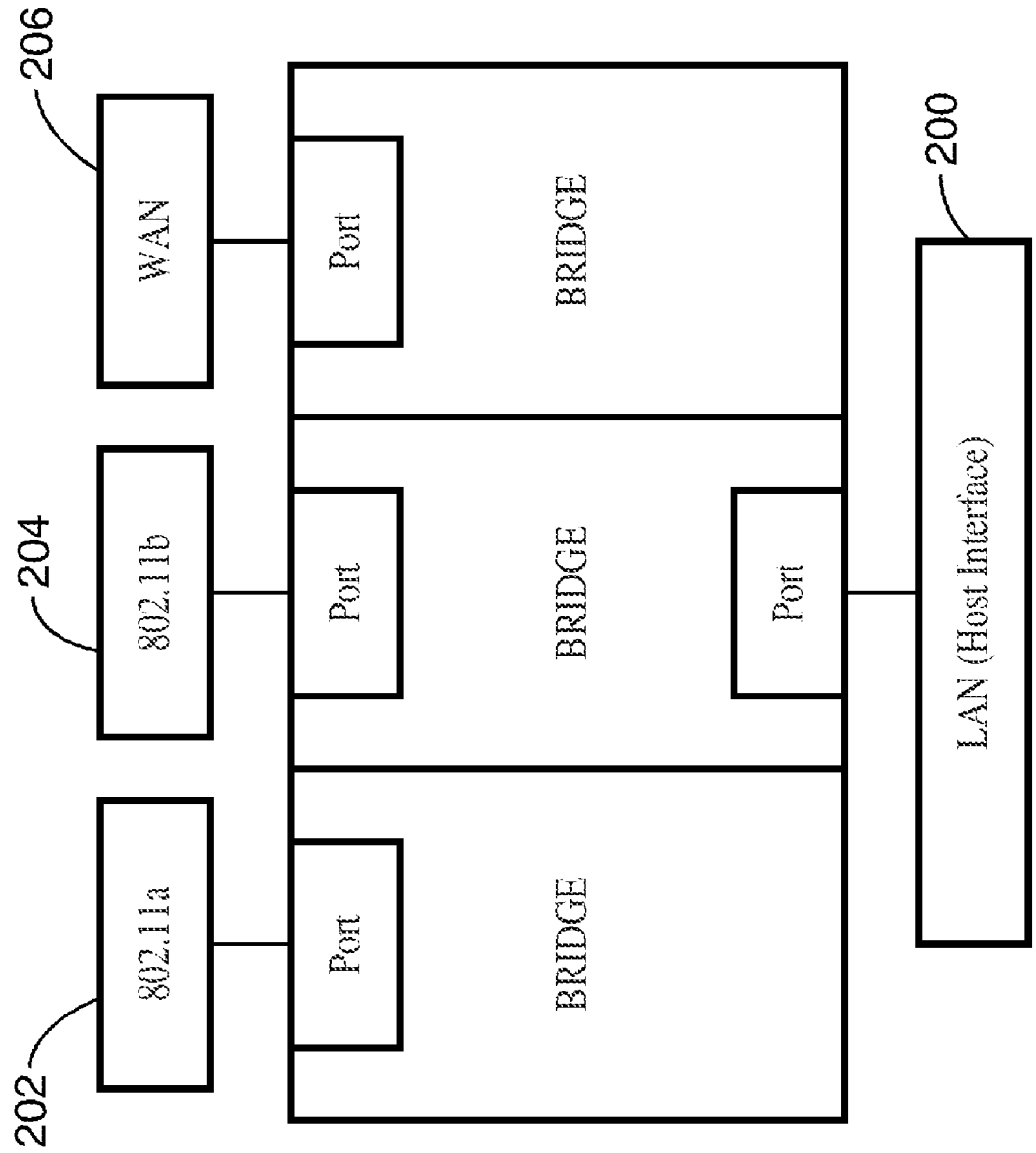
FIG. 12 is a block diagram of a dual WLAN and WAN configuration supported by the wireless intelligent switch engine of the present invention.
Figure 13:
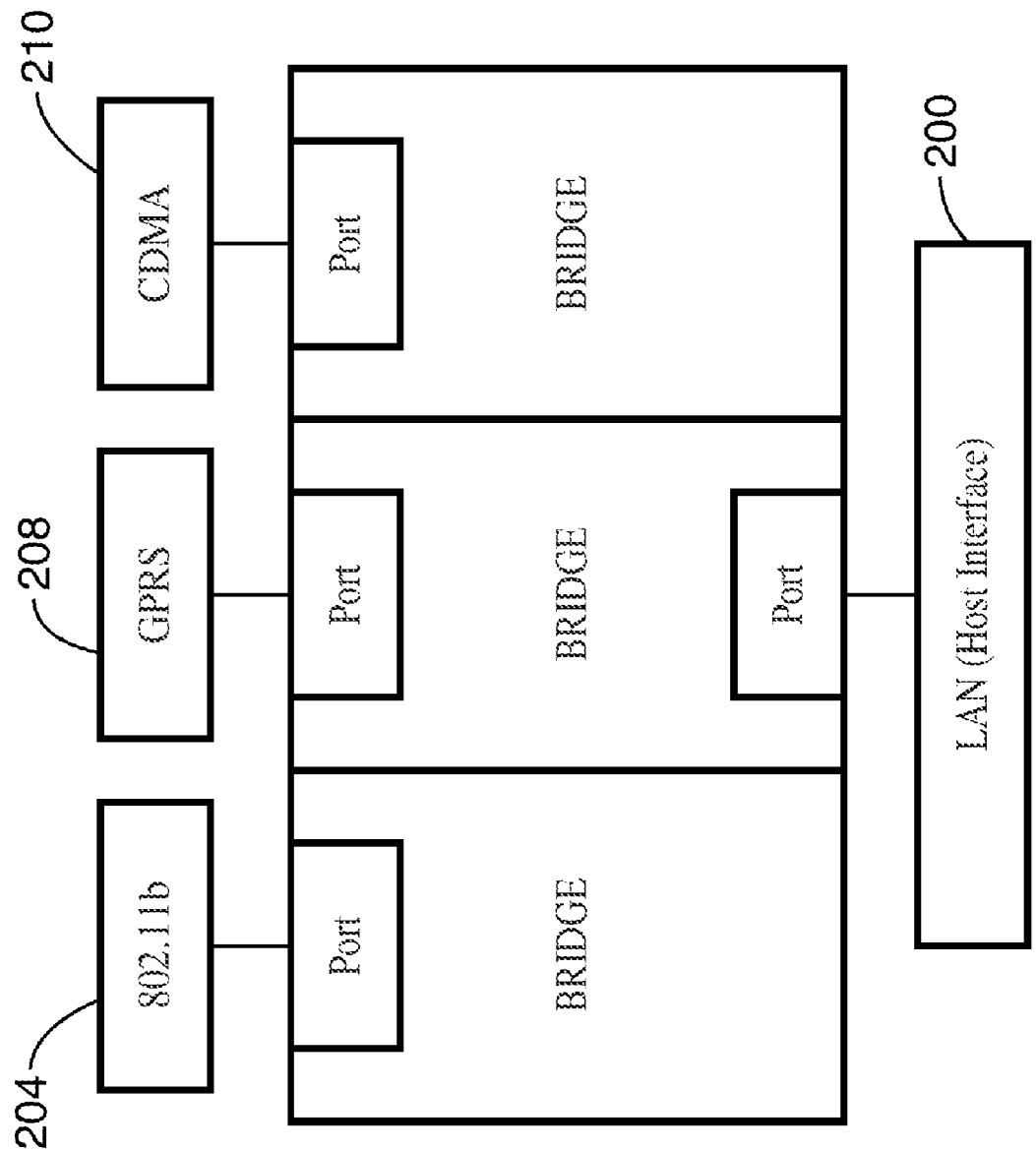
FIG. 13 is a block diagram of a WLAN and dual WLAN configuration supported by the wireless intelligent switch engine of the present invention.

Referring now to FIG. 10 through FIG. 13, WISE 20 can be configured to support various combinations of wireless interfaces as shown. FIG. 10 shows a dual mode 802.11a/b configuration, FIG. 11 shows a WLAN and WAN configuration, FIG. 12 shows a dual WLAN and WAN configuration, and FIG. 13 shows a WLAN and dual WAN configuration. For example, in FIG. 10, WISE 20 has one internal interface 200 (a LAN host interface) and two external wireless interfaces 202, 204, one of which is an 802.11a WLAN interface and the other of which is an 802.11b WLAN interface. A similar configuration is shown in FIG. 11, except that a cellular WAN interface 206 is provided instead of the 801.11a interface 202 shown in FIG. 10. The configuration of FIG. 12 combines the capabilities of the configurations of FIG. 10 and FIG. 11 by employing all three types of wireless interfaces; namely, 802.11a, 802.11b and WAN interfaces. Lastly, the configuration of FIG. 13 employs an 802.11b interface and a GPRS interface 208 and a CDMA interface 210. From the network IP address connection (OSI Layer 3) point of view, there are three IP addresses for the mobile device in the configurations shown in FIG. 10 and FIG. 11 and four IP addresses for the mobile device in the configurations shown in FIG. 12 and FIG. 13. In other words, there is one IP address for the LAN interface and a separate IP address for each of the wireless interfaces.

Figure 14:
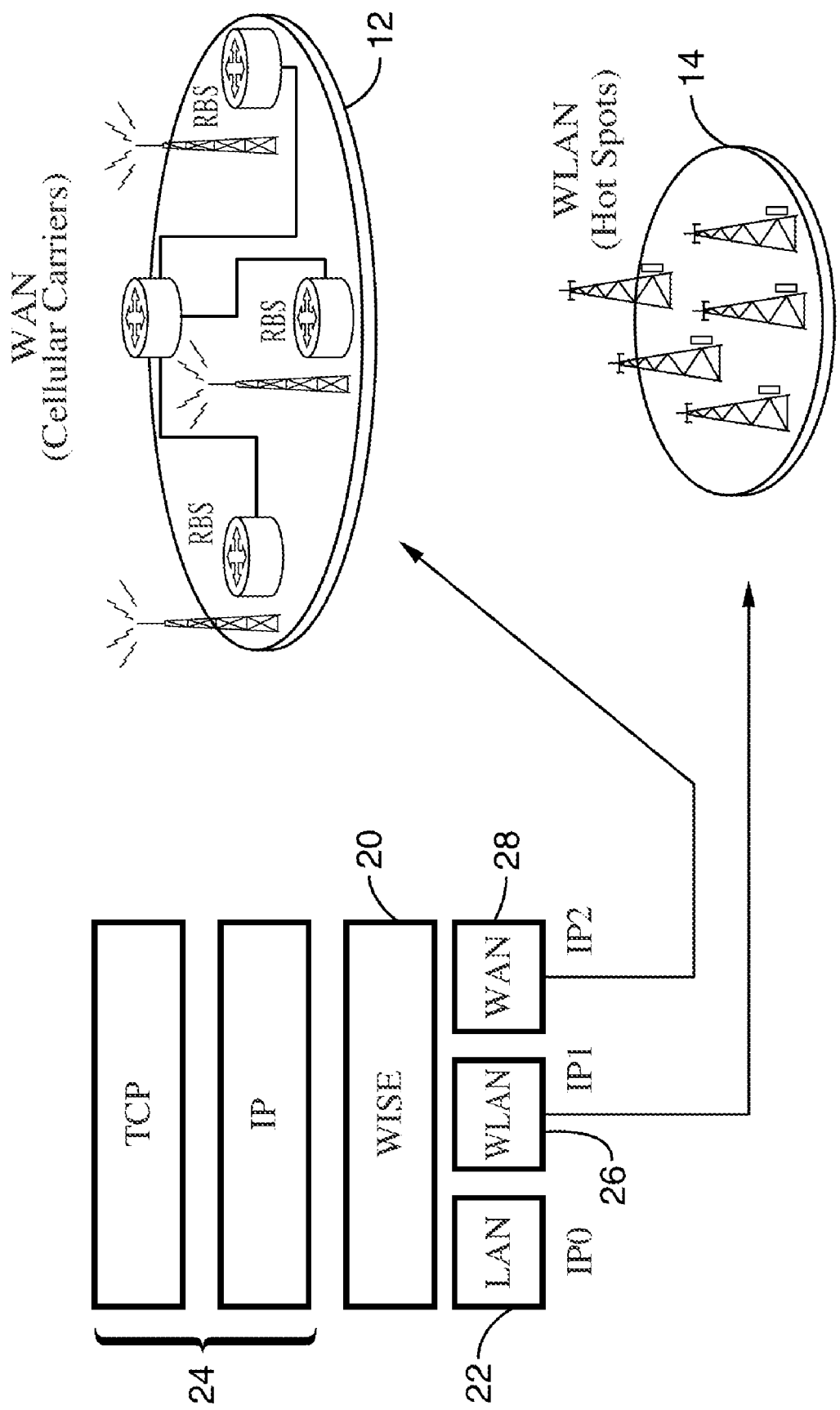
FIG. 14 is a schematic diagram illustrating the wireless intelligent switch engine of the present invention functioning as a gateway router between a mobile device and wireless network according to the present invention.

For example, assume the configuration shown in FIG. 11 which corresponds to the protocol stack shown in FIG. 2. The two external interfaces provide gateway routing functions for the internal LAN IP address of mobile device 18. Referring to FIG. 14, if the WLAN interface 26 is the active interface, data packets from mobile device 18 would be communicated from LAN interface 22 (IP0) to WLAN 14 through WLAN interface 26 (IP1). On the other hand, if the WAN interface 28 is the active interface, data packets from mobile device 18 would be communicated from LAN interface 22 (IP0) to WAN 12 through WAN interface 28 (IP2). It will be appreciated, therefore, that the WISE 20 protocol stacks shown in FIG. 2 and elsewhere are not limiting; the protocol stack would be expanded to accommodate any particular number and/or type of wireless interface to which mobile device 18 would be connected.

It will be appreciated, therefore, that WISE 20 provides a seamless roaming capability to a mobile device. However, in addition to seamless roaming, since battery life is an important consideration with any mobile device WISE can provide power management to shut down, or to place into standby, wireless interfaces that are not being used. For example, referring again to FIG. 14, if WLAN interface 26 is not the active interface, it can be powered down. Note also that, when mobile device 18 is moving farther way from, for example, WLAN 14, the signal quality for the WLAN interface 26 may degrade. In that instance, WISE 20 can turn on WAN interface 28 in preparation for roaming when the WLAN signal is no longer usable.

While the invention has been described in terms of specific types of wireless networks and wireless network interfaces, those skilled in the art will appreciate the invention is not so limited and that any wireless network and associated network interface can be accommodated. It will further be appreciated that the invention can be implemented in firmware and/or software using conventional hardware design and programming techniques. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for switching between network interfaces, comprising:
   a switch engine configured for operating at the data link layer of a protocol stack for a given interconnection model configured for operation with multiple network interfaces;
   said switch engine configured to automatically select and establish a network connection session for a mobile device through an active interface, within the multiple network interfaces; and
   a bridge formed by said switch engine between at least two associated wireless network interfaces of different types in response to the mobile device roaming among different wireless networks having different network interfaces, without closing and restarting the network connection session which has been established.

2. An apparatus as recited in claim 1:
wherein said protocol stack comprises the Open Systems Interconnection (OSI) reference model for a TCP/IP protocol; and
wherein said switch engine is configured for operating within the data link layer of the of said protocol stack.

3. An apparatus as recited in claim 1, wherein said switch engine communicates with said wireless interfaces through a priority field within a packet header using tag control information.

4. An apparatus as recited in claim 3, wherein the priority field is used to select a wireless interface based on a priority criteria selected from the group of fields consisting essentially of frame quality, receive frame CRC error, and signal strength.

5. An apparatus as recited in claim 1, wherein said switch engine performs quality of service priority queuing in determining selection of the network interface within the multiple network interfaces.

6. An apparatus as recited in claim 5, wherein said quality of service priority queuing is performed based priority, bandwidth, signal strength, frame quality, frame error rate (FER), receive frame CRC error, or combinations thereof.

7. An apparatus as recited in claim 1, wherein said switch engine utilizes bandwidth tagging with a tag control information field to control which network interface is selected.

8. An apparatus as recited in claim 7, wherein said tag control information field maps to a switching/packet management table as a switching criteria.

9. An apparatus as recited in claim 1, further comprising power management within said switch engine which shuts down, or places into standby mode, network interfaces, within the multiple interface devices, which it determines are not the active interface device to reduce power consumption.

10. An apparatus for multiple-network communications, comprising:
a mobile device configured for establishing a network connection session for communicating with different types of wireless networks through multiple network interfaces; and
a switch engine, configured for operation within a data link layer of a protocol stack of said mobile device, for automatically selecting one of said multiple network interfaces in response to said mobile device roaming between the different types of wireless networks, and without closing and restarting the network connection session;
wherein said switch engine is configured for quality of service priority queuing when determining selection of a network interface, within the multiple network interfaces, as the active network interface.

11. An apparatus as recited in claim 10, wherein said switch engine operates within a data link layer of a protocol stack.

12. An apparatus as recited in claim 11, wherein said protocol stack comprises the Open Systems Interconnection (OSI) reference model for a TCP/IP protocol.

13. An apparatus as recited in claim 10, wherein said switch engine is configured to reduce power consumption in response to shutting down, or to placing into standby mode, wireless network interfaces which are not being utilized.

14. An apparatus as recited in claim 10, wherein said quality of service priority queuing is performed based on priority, bandwidth, signal strength, frame quality, frame error rate (FER), receive frame CRC error, or combinations thereof.

15. An apparatus as recited in claim 10, wherein said switch engine utilizes bandwidth tagging with a tag control information field to control which network interface is selected.

16. A method of mobile device communication when roaming across multiple networks without closing and restarting network connection sessions, comprising:
selecting a network interface for a network connection session, from multiple network interfaces available to a mobile device, when roaming across multiple networks, in response to determining frame quality and using tag control information to identify the network interface; and
bridging between the mobile device and associated network interfaces within the protocol stack of the mobile device, and automatically switching between the network interfaces as the mobile device roams between multiple networks;
wherein said bridging is performed between different types of wireless networks without closing and restarting the network connection session.

17. A method as recited in claim 16, wherein said bridging is performed within a data link layer of a protocol stack.

18. A method as recited in claim 17, wherein said protocol stack comprises the Open Systems Interconnection (OSI) reference model for a TCP/IP protocol.

19. A method as recited in claim 16, further comprising managing power consumption by identifying which network interfaces are not active, and shutting down, or placing into standby, network interfaces that are not being utilized.

20. An apparatus for multiple-network communications, comprising:
a mobile device configured for establishing a network connection session for communicating with different types of wireless networks through multiple network interfaces; and
a switch engine, configured for operation within a data link layer of a protocol stack of said mobile device, for automatically selecting one of said multiple network interfaces in response to said mobile device roaming between the different types of wireless networks, and without closing and restarting the network connection session;
wherein said switch engine utilizes bandwidth tagging with a tag control information field to control which network interface is selected.

* * * * *